United States Patent
Ménioux

[15] 3,635,029
[45] Jan. 18, 1972

[54] COMPOSITE GAS TURBINE RAMJET ENGINE

[72] Inventor: Claude Charles Félix Ménioux, Boulonge-sur-Seine, France

[73] Assignee: Societe Nationale D'Etude Et De Construction De Moteurs D'Aviation, Paris, France

[22] Filed: Sept. 5, 1969

[21] Appl. No.: 855,608

[30] Foreign Application Priority Data

Sept. 6, 1968 France..................165337

[52] U.S. Cl. ...........................................60/224
[51] Int. Cl. ..............................F02k 3/02, F02k 3/08
[58] Field of Search .................60/224, 225, 226, 244

[56] References Cited

UNITED STATES PATENTS

| | | | |
|---|---|---|---|
| 3,153,904 | 10/1964 | Ellis | 60/244 |
| 3,161,018 | 12/1964 | Sandre | 60/244 |
| 3,192,712 | 7/1965 | Nash | 60/244 |
| 3,432,100 | 3/1969 | Hardy | 60/244 |

FOREIGN PATENTS OR APPLICATIONS

| | | | |
|---|---|---|---|
| 613,925 | 2/1961 | Canada | 60/226 |
| 704,669 | 2/1954 | Great Britain | 60/224 |

Primary Examiner—Douglas Hart
Attorney—Watson, Cole, Grindle & Watson

[57] ABSTRACT

A composite turbo-ramjet engine comprising, in combination:

two ducts separated from each other by a wall and supplied with air from a common air intake, the two ducts consisting of, firstly, a primary turbojet duct which includes a gas-turbine-type gas generator of hot gases, a primary discharge nozzle, and adjustable means to block off the said primary nozzle, and secondly, a secondary duct including a secondary combustion chamber for ramjet operation and a secondary discharge nozzle;

at least one connecting passage between the primary and the secondary ducts, the said passage being formed through the said wall downstream of the turbine and upstream of the secondary combustion chamber;

adjustable obturation means for the said connecting passage, and adjustable obturation means for the secondary ramjet duct upstream of the secondary combustion chamber.

7 Claims, 15 Drawing Figures

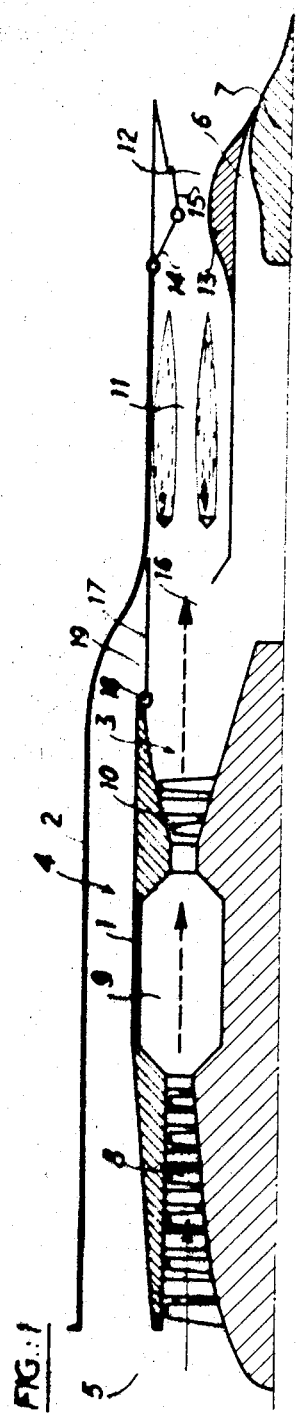
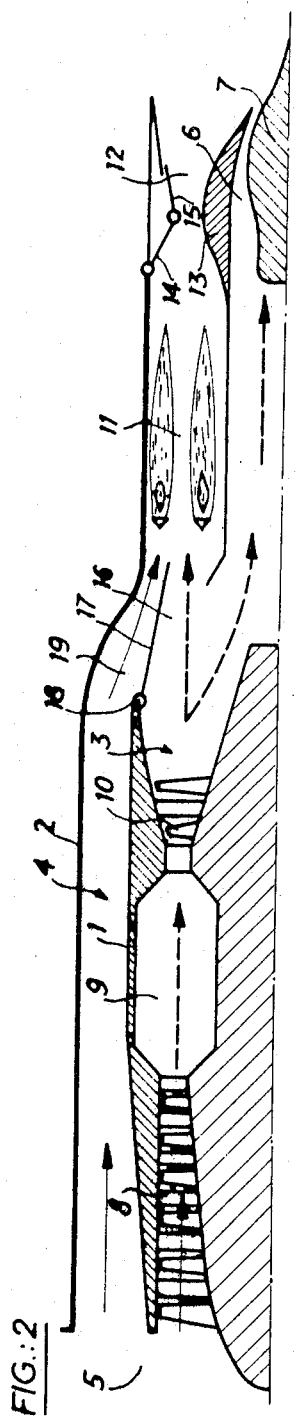
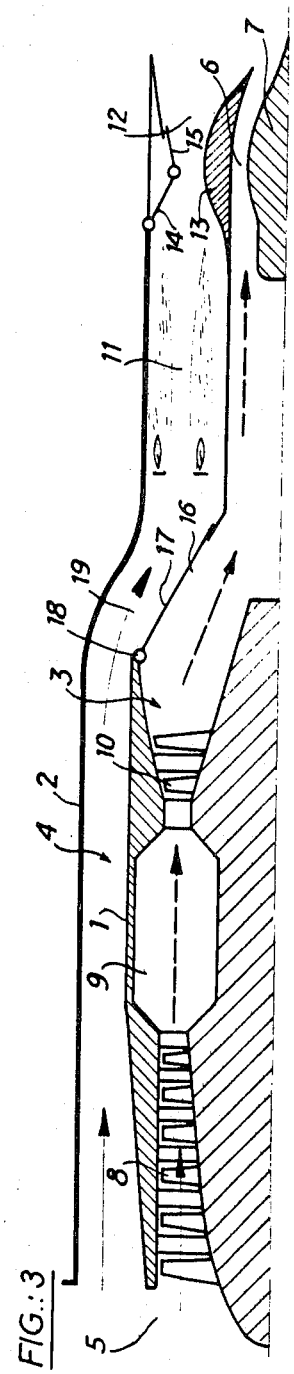

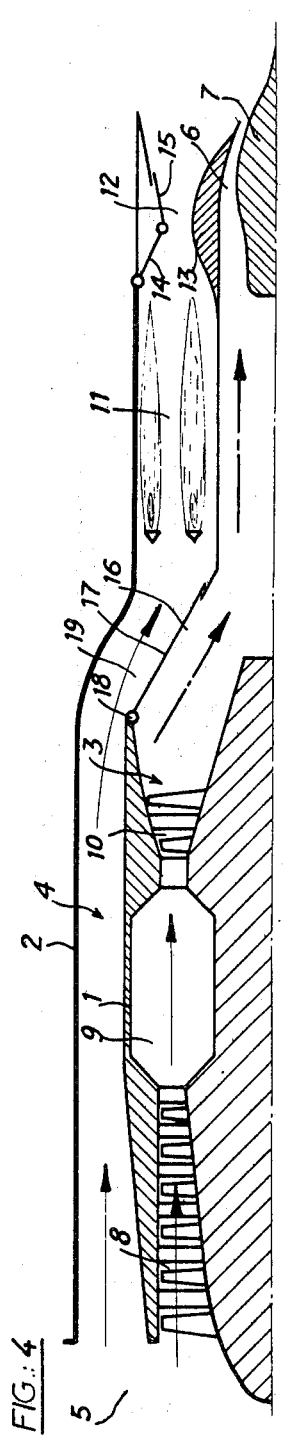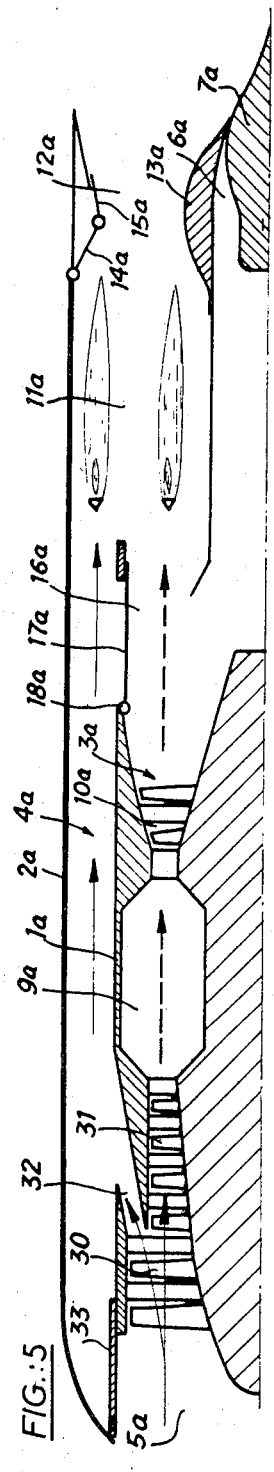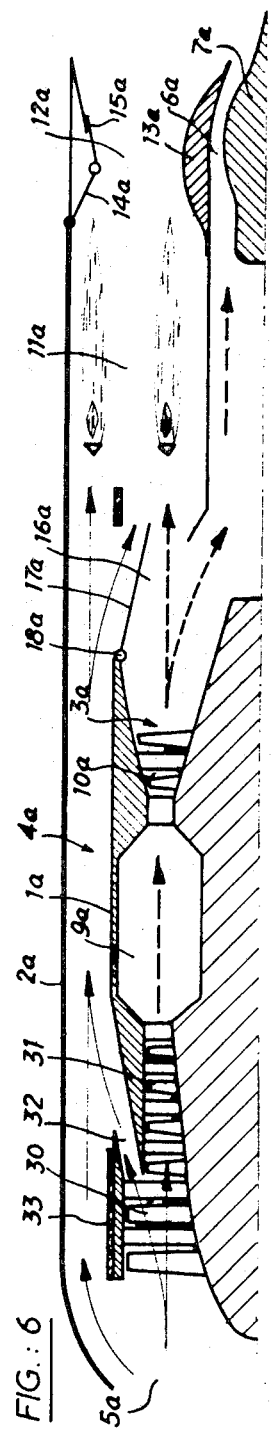

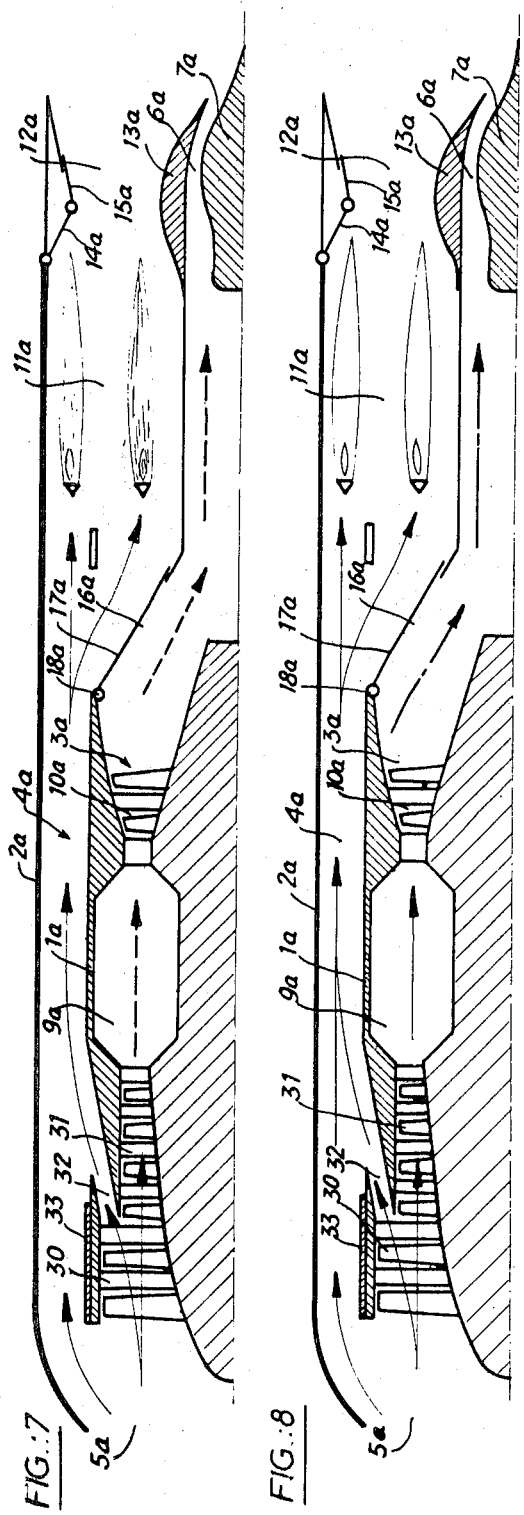
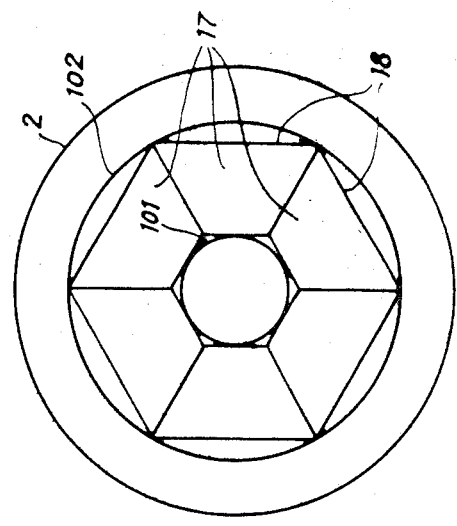

FIG.:9
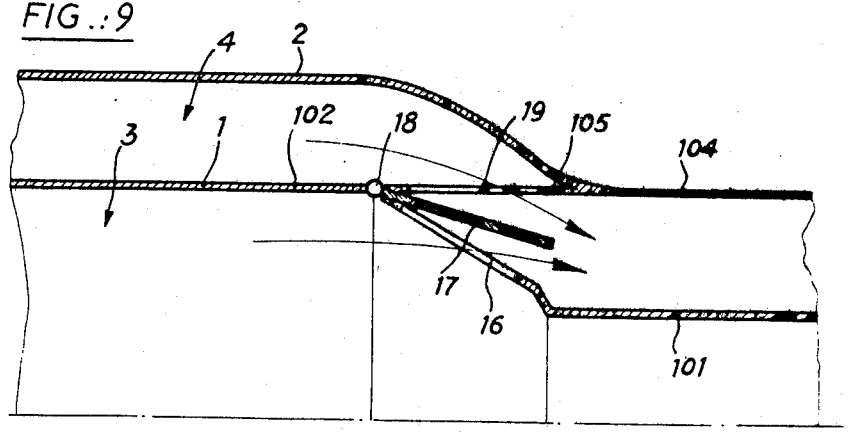
FIG.:10
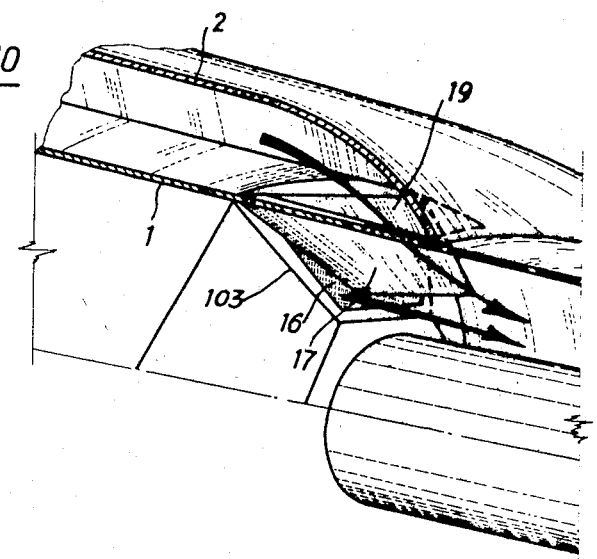

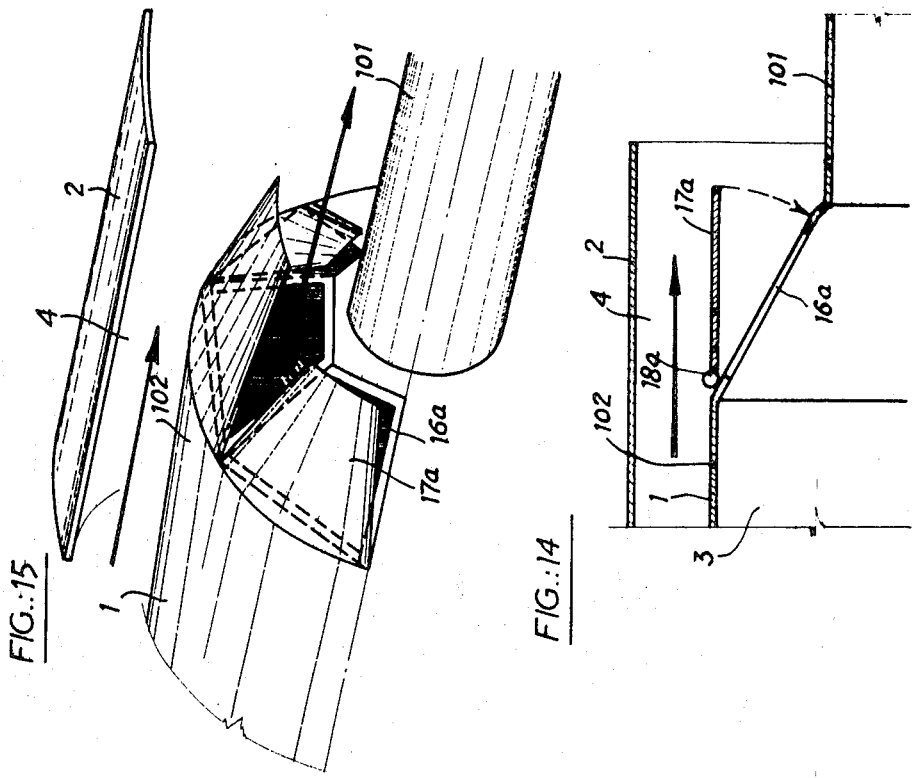
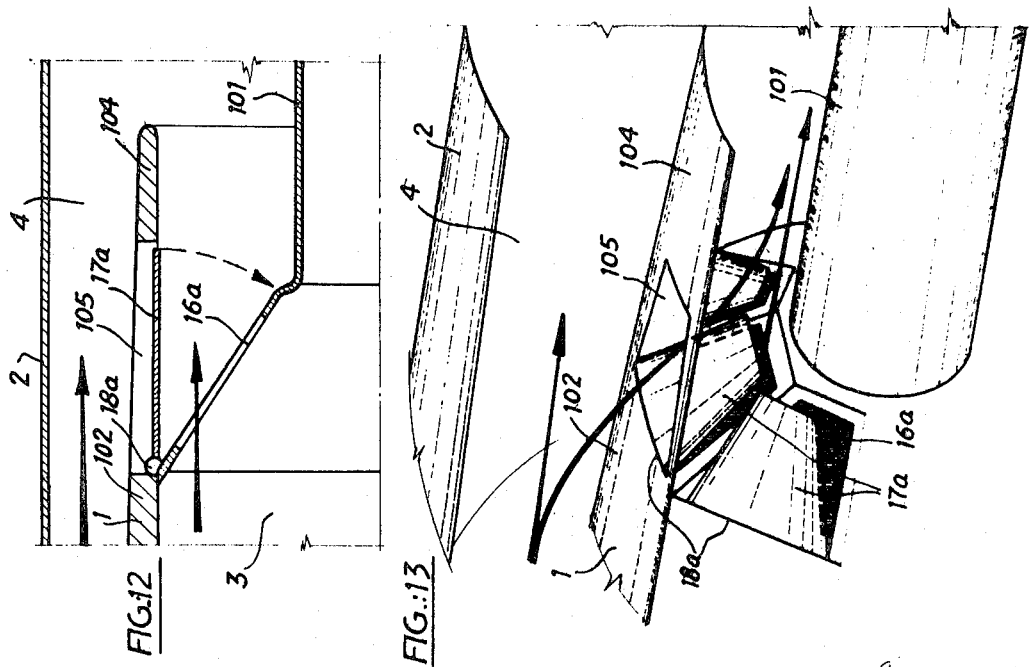

COMPOSITE GAS TURBINE RAMJET ENGINE

The present invention relates to a composite propulsion device for airborne machines, and more especially for aircraft, that is capable of supplying with good efficiency a high thrust over the full range of speeds included between the takeoff of the aircraft and a cruising speed well into supersonic figures.

Composite propulsion devices are already known, constituted by the association of a gas turbine engine with a ramjet engine. These devices put to good use the differing and to some extent complementary qualities of these two types of engine, of which it may be said, in summary form, that the first-named is suitable for propulsion at relatively low, subsonic or slightly supersonic speeds, whereas the second-named makes it possible to achieve, with good efficiency and a low fuel consumption, speeds which extend far into the supersonic range.

The invention has for its object an improved composite gas turbine and ramjet engine, conveniently termed a turbo-ramjet engine, which makes it possible to obtain excellent performance figures over a wider range of flight parameters than in the case of already known combinations. As will be seen hereinafter, the said composite engine brings about the synthesis of the qualities of reheat-equipped gas turbine jet engines of the single-flow or of the dual-flow type (bypass engines) at subsonic or slightly supersonic speeds, and of the qualities of ramjets with high supersonic speeds, and in other respects it possesses a series of advantages, more especially with reference to the possibility, after the extinction of the gas turbine combustion chamber when high speeds have been attained, of allowing the moving parts of the said gas turbine engine to windmill under the effect of the relative wind velocity. The composite engine according to the invention includes in combination:

two ducts separated from each other by a wall and supplied with air from a common air intake, the two ducts consisting of, firstly, a primary duct which includes a gas-turbine type gas generator, a primary discharge nozzle, and adjustable means to block off the said primary nozzle, and secondly, a secondary duct comprising a secondary combustion chamber and a secondary discharge nozzle;

at least one connecting passage between the primary and the secondary ducts, the said passage being formed through the said wall downstream of the turbine and upstream of the secondary combustion chamber;

adjustable obturation means for the said connecting passage, and obturation means for the secondary duct upstream of the secondary combustion chamber.

The two ducts are preferably coaxial, the secondary duct surrounding the primary duct.

According to one arrangement of the invention, the means for adjustable obturation of the connecting passage between the two ducts comprises at least one flap hinged on the separating wall between the two ducts, the said flat in one of its extreme positions blocking off the said connecting passage. As regards the obturation of the secondary duct, the design may be such that the said duct comprises an upstream and a downstream section separated from each other by at least one obturatable aperture arranged in the vicinity of the connecting passage between the two ducts, the said aperture being able to be blocked off by the selfsame flap in the other of the extreme positions of the said flap. Other means, such as a sliding valve body, may, however, be provided to block off the secondary duct.

According to one arrangement of the invention and applicable to the case in which the gas generator forms part of a gas-turbine engine with a dual flow, that is, an inner hot flow and an outer cold flow, the inner flow passes along the primary duct, whereas the outer flow is injected into the secondary duct, downstream of the obturating means of the said duct, via supplementary connecting passages between the two ducts, these passages being, if so required, of adjustable cross section.

The arrangement set out above renders it possible, as will be seen hereinafter, to make the composite power plant operate according to several possible configurations, with the option of continuous transition from one to another: a pure turbojet, a turbo-ramjet with a partially mixed flow, a turbo-ramjet with separate flows, and a pure ramjet, each of the said configurations possessing its own advantages, depending on flight conditions.

The following description with reference to the accompanying drawing and given by way of nonlimitative example will bring out how the invention may be put into effect.

FIGS. 1 to 4 are diagrammatic views in axial section of a turbo-ramjet composite engine according to the invention, in accordance with four main but differing configurations relating respectively to operation as: a pure turbojet, a turbo-ramjet with partially mixed flows, a turbo-ramjet with separate flows, and a pure ramjet. The gas generator forms part of a gas-turbine installation with a single flow;

FIGS. 5 and 8 are views similar to FIGS. 1 to 4, but relate to the case of a turbo-ramjet composite engine fitted with a gas generator forming part of a gas turbine installation of the dual flow or bypass type;

FIG. 9 comprises a diagrammatic view, in axial section, of one detail of the FIGS. 1 and 4, showing an adjustable obturating device for a connecting passage between a primary duct and a secondary duct, both according to the invention, the passage being combined with an obturating device for the secondary duct;

FIG. 10 is a diagrammatic view in perspective of the device illustrated in FIG. 9;

FIG. 11 is a view from the rear, seen from downstream, of the arrangement illustrated in FIGS. 9 and 10:

FIG. 12 is a diagrammatic view, in axial section, of a detail of FIGS. 5 to 8, showing an adjustable obturating device for a connecting passage between a primary and a secondary duct;

FIG. 13 is a diagrammatic view in perspective of the device illustrated in FIG. 12; and FIGS. 14 and 15 show views similar to FIGS. 12 and 13 according to a modification.

As regards FIGS. 1 and 4, here are shown, in several differing configurations, a turbo-ramjet composite powerplant according to the invention and intended to fit into an airborne machine, such as an aircraft. The said powerplant comprises, within the bounds provided by a housing wall 1 and a casing wall 2 a primary duct designated by the general reference numeral 3, and a secondary duct designated by the general reference numeral 4. The said housing and casing walls have been shown as coaxial, the housing wall 1 bounding the primary duct and acting at the same time as a separating wall between the two ducts, these latter being supplied from a common air intake 5.

The primary duct 3 essentially comprises a gas-turbine type generator of hot gases, for example of the single-flow type, and at its downstream portion it terminates in a primary discharge nozzle 6 of adjustable cross section, for example by means of an axially movable center body 7. As FIG. 1 shows, this center body may occupy a position in which the primary nozzle is entirely blocked.

The gas generator conventionally comprises a compressor 8, a combustion chamber 9 and a gas turbine 10 which drives the compressor. It may be formed as a single body or in several units.

The secondary duct 4 is completely distinct from the primary duct. In the form of embodiment shown, it possesses an annular general form and in its essentials includes a secondary discharge nozzle 12 with a center body 13. The said nozzle is preferably of variable-geometry type, and the reference numerals 14 and 15 have been employed to designate flaps which render it possible to adjust the cross-sectional area at the throat, and the cross-sectional area at the efflux end of the said nozzle, both as a function of the operating conditions applying to the power plant and of the flight conditions for the aircraft. It will be seen that the respective efflux ends of the primary nozzle 6 and of the secondary nozzle 12 are substantially coplanar.

Between the two ducts 3 and 4 is arranged at least one connecting passage 16 located downstream of the turbine 10 but upstream of the secondary combustion chamber 11. At least one flat 17, hinged at 18 onto the housing wall 1 separating the two ducts and located vicinity of the upstream end of the passage 16, renders it possible while in one of its extreme positions, as shown in FIGS. 3 and 4, to block the said passage completely. In its other extreme position, shown in FIG. 1, the said flap frees the connecting passage 16 but, on the other hand, completely blocks off an aperture 19, so separating from each other an upstream portion of the secondary duct which is linked with the air intake 5, and a downstream portion of this duct containing the secondary combustion chamber 11. FIG. 2 shows the flap 17 in an intermediate position, for which the communicating passage 16 and the aperture 19 are partially open.

Hereinafter an analysis will be made of the various configurations which may be obtained with the assistance of the assembly of arrangement described hereinbefore.

FIG. 1 relates to the case in which the powerplant is operating as a pure turbojet engine. The primary nozzle 6 is entirely blocked by means of a center body 7, and the flat or flaps 17 occupy one of their extreme positions, for which the connecting passage or passages 16 are completely open, whereas the secondary duct is entirely blocked off upstream of the secondary combustion chamber 11. The entirety of the throughput of air taken in by the powerplant therefore undergoes the thermodynamic cycle pertinent to the gas-turbine-type gas generator. The gas flow expanded in the turbine portion 10 of the gas generator passes through the passages 16 and penetrates into the secondary combustion chamber 11, which acts as a chamber for reheat. The gases escaping from the chamber 11 are ejected into the atmosphere through the secondary nozzle 12.

This configuration is particularly advantageous at takeoff and in flight at subsonic or slightly supersonic speeds. On this point, it will be observed that the combustion chamber 11 can be inoperative, the turbojet engine then operating without reheat.

When the flight speed is sufficiently high for the performance figures of a ramjet to start amounting to appreciable values, i.e., for a Mach number in flight or the order of 3 for example, the configuration described above is modified in the manner indicated below.

FIG. 2 relates to a so-called transitional configuration in which the primary nozzle 6, the passages 16 and the apertures 19 are partially open. A portion of the gas flow leaving the gas generator 8, 9, 10 is ejected through the primary nozzle 6, while the other portion of the said flow continues to pass through the passages 16 and mixes with the throughput of fresh air arriving by way of the secondary duct 4. The mixture is subject to reheat in the secondary combustion chamber 11, and is ejected via the secondary nozzle 12.

In the course of this phase, an increasing proportion of the gas flow originating in the gas generator 8, 9, 10 is thus ejected via the primary nozzle without undergoing reheat. As can be imagined, this way of working decreases the overall specific thrust of the powerplant. But at the same time an increasing throughput of air is admitted through the secondary duct 4 into the secondary combustion chamber 11, which therefore functions as a ramjet.

The configuration of the powerplant is therefore of the turbo-ramjet type, with the flows being partially mixed. Through action applied on the primary and secondary nozzles and, if the need arises, on the temperature upstream of the turbine 10, it is possible to control the working of the powerplant in such a way as to obtain the requisite equality of the static pressures at the confluence of the two flows, at the entrance to the secondary combustion chamber 11.

The increase in the throughput of air traversing the powerplant assembly more than compensates for the decrease in specific thrust, and makes it possible to obtain appreciable total thrust during this flight phase.

FIG. 3 relates to the configuration achieved at the end of the transitional phase, when the primary nozzle 6 is completely open and when the flap or flaps 17 are in their other extreme position, for which the connecting passage or passages 16 between the two ducts are completely blocked, while the aperture or apertures 19 are completely open. The two ducts 3 and 4 are therefore entirely separate, and the gas flow originating in the gas generator 8, 9, 10 is ejected through the primary nozzle 6, while the secondary combustion chamber 11, supplied with pure air directly via duct 4 and cooperating with nozzle 12, operates in the ramjet mode.

The operation of the primary gas generator 8, 9, 10 thus becomes entirely independent of that of the ramjet. The state of the said generator can be adjusted by varying the cross section at the throat of the primary nozzle 6 in such a way as simultaneously to maintain a high temperature upstream of the turbine 10. Similarly, the throughput of air taken up by the ramjet can be adjusted by varying the cross section at the throat of the secondary nozzle 12.

Operation with totally separate flows possesses numerous advantages in the flight conditions achieved. Among these advantages, the following may be noted:

1. The postponement of the instant at which the primary gas generator, kept operating at high speeds, flames out.

On this matter, it will be appreciated that, so that combustion should remain possible in a chamber such as 9, it is necessary to decrease the speed of the air reaching the said chamber. As is well known, this retardation entails a correlative increase of the air temperature inside the chamber, the consequence of this being a narrowing of the margin available between the maximum permissible temperature (as determined by the thermal resistance characteristics of the materials making up the turbine) and the effective temperature of the air at its input to the chamber. It follows that the amount of fuel it is possible to inject, and consequently the external addition of energy, decreases when the speed of flight increases. Above a certain Mach number in flight, the richness of the air-plus-fuel mix in the combustion chamber becomes inadequate, and combustion ceases, this phenomenon occurring at a Mach number which is all the higher the greater the maximum permissible temperature ahead of the turbine.

Bearing this in mind, let it be supposed for a start that the two flows are not entirely separate and that the powerplant continues to operate, at a very high Mach number, according to the configuration shown in FIG. 2. As it well known, this configuration involves the requirements of continuing to observe the equality of the static pressures at the confluence of the hot and the cold flow upstream of the secondary combustion chamber 11. Now, the loss of pressure along the portion of the secondary duct 4 that is located upstream of the confluence area is very low. The result is that the pressure at the exit from the turbine 10 cannot drop below a certain value, this limiting the rate of expansion possible along the turbine, and consequently the power supplied by the said turbine.

When the Mach number rises, this limitation has to be added to the loss of power due to the decrease in the richness of the air-plus-fuel mix mentioned above, and therefore has the effect of advancing the moment at which the primary gas generator 8, 9, 10 stops.

An increase of gas temperature ahead of the turbine would doubtless make it possible slightly to postpone this occurrence, but would implicate the mechanical behavior of the turbine.

It would likewise be possible to consider increasing the speed of the airflow in the vicinity of the area of confluence, so as to decrease its static pressure, but combustion in the chamber 11 would be harder to stabilize and drops in pressure would be very considerable.

The solution proposed makes it possible to avoid these drawbacks, but only on conditions that the two flows are made independent of each other before the Mach number has reached a critical valve $M_c$, which depends on the maximum temperature $T_c$ permissible ahead of the turbine. By way of example, the indication is given that, for a maximum permissible temperature $T_c$ of the order of 1,250° C. the critical Mach number $M_c$ is of the order of 3.15.

2. The fact that, over when the gas generator has been extinguished, it can be used as an auxiliary power source.

Under the effect of the relative wind, due to the forward motion of the aircraft, its moving parts are in effect operating as an air-driven motor, its so-called autorotational speed being controllable by varying the cross section at the throat of the primary nozzle 6.

In every case, i.e., both during normal operation and during autorotation, the primary generator 8, 9, 10 can therefore supply the power needed for the auxiliary services on board the aircraft carrying the powerplant, and for driving its own sets of equipment, such as fuel and oil pumps, regulating mechanisms, etc.

Control, through the agency of the primary nozzle, of the speed of autorotation, also makes the restarting of the primary generator possible under optimum conditions when the flight speed is decreasing, this being effected without it being necessary to use an auxiliary device such as a starter motor.

On this subject, it will be observed that it is advantageous, from this point of view also, for the two powerplant flows to be separate, In fact, if such were not the case, the expansion ratio through the moving parts of the primary generator would be limited for the same reason as that set out above, which would have the consequence that the power available as a result of autorotation would be very small, and it would therefore be necessary to provide an auxiliary power generator, in the first place to drive the various units of equipment while cruising at high supersonic speeds and in the second place to ensure the restarting of the primary generator during the deceleration phase.

3. When the primary generator 8, 9, 10 is used as an air-driven motor, it constitutes a source of cold air at a pressure level sufficient to cool many various equipment parts, as well as the wall housing 1 separating the primary and secondary ducts, in the region of the combustion chamber 11 and of the secondary nozzle 12.

It should be noted, at this point in the explanation, that the composite powerplant according to the invention possesses, in the configuration involving separated flows discussed immediately above, same similarities and some advantages in common with a gas turbine jet engine of the bypass type. Such a gas turbine jet engine with a dual flow, however, apart from the fact that its overall range of usefulness is limited, possesses various drawbacks. If in fact the matter under consideration was a gas turbine jet engine with heat for the secondary flow but without reheat for the primary flow, its specific thrust would be distinctly inferior at subsonic or slightly supersonic speeds to the specific thrust of a gas turbine jet engine with a single flow or with a dual flow and with reheat. If, on the other hand, a gas turbine jet engine was being considered with heat for the secondary flow and reheat for the primary flow, then, in embodying walls separating the two flows and in embodying the primary and secondary nozzles, considerable difficulties of a technological nature would arise, due to the fact that the said walls and the said nozzles are subject to very high temperatures along both their surfaces.

FIG. 4 relates to a fourth configuration, likewise involving entirely separate flows, as in the preceding case, the corresponding in respect of very distinctly supersonic flight speeds to operation as a pure ramjet in the secondary duct.

The primary gas generator has been extinguished. Traversed by a portion of the air originating at the air intake 5, it operates as an air-driven motor whose speed of rotation and power can be varied by acting on the cross-sectional area at the threat of the primary nozzle 6. This power is sufficient, as has been seen above, to drive various accessory items of the installation and to ensure the subsequent restarting of the primary generator.

After expansion in the turbine, fresh air is obtained the stagnation temperature of which is lower than the stagnation temperature of the air at the entrance to the ramjet.

This fresh air may be used, overall or in part, for cooling purposes and to ventilate the ramjet duct and the nozzle. Air not used for cooling is ejected through the primary nozzle 6.

FIGS. 5 to 8 relates to the case in which the gas turbine generator, mounted in the primary duct, is of the type with a dual flow. The parts common to these figures and to FIGS. 1 to 4 will be designated by the same reference numerals but now followed by the indicating letter *a* and will not be described again in detail. The compressor comprises a low-pressure section or fan 30 and a high-pressure section 31. One portion of the throughput originating in the fan 30 is compressed in the high-pressure section 31 before penetrating to the primary combustion chamber 9a. The remainder of the throughput originating in the fan 30 is injected into the secondary duct 4a through supplementary connecting passages 32 which link the two ducts. These passages which, if so required, may be of adjustable cross-sectional area consequently form additions to the passages 16a, themselves like the passages 16 described in relation to FIGS. 1 to 4.

Flaps 17a, similar to the flaps 17, make it possible, in one of their extreme positions as shown in FIGS. 7 and 8, completely to block the passages 16a. The said flaps are, however, without effect as far as the obturation of this duct is effected by means of a sliding valve body 33 arranged in the vicinity of the upstream and of the said duct.

In the configuration shown in FIG. 5, the sliding body 33 is in the closed position, as is the primary nozzle 6a, whereas the passages 16a are open. The entirety of the primary throughput of hot gases passes through the apertures 16a after expansion in the turbine 10a, and mixes with the cold outer flow originating in the supplementary passages 32. After mixing together, the gases undergo reheat in the chamber 11a and are ejected through the secondary nozzle 12a. This configuration therefore correspond to operation in a dual-flow gas turbine jet mode with the two flows being mixed before reheat.

In the configuration shown in FIG. 6, the sliding body 33 is open. Similarly, the primary nozzle 6a and the passages 16a are at least partially open. One portion of the hot primary flow is ejected through the primary nozzle 6a. "Tertiary" air penetrates directly into the secondary duct 4a and in the area of confluence 32 mixes with the "secondary" air originating in the fan 30. The mixture of secondary and tertiary air then penetrates to the secondary combustion chamber 11a and mixes with the residue of the primary hot flow passing by way of the apertures 16a. After reheat, the said gases are ejected through the secondary nozzle 12a. The flaps 17a can adopt an intermediate position to facilitate the mixing of the primary hot flow and of the cold flow originating in the secondary duct 4a, and to improve the distribution of gases at the entrance to the chamber 11a.

By acting on the nozzles 6a and 12a and, if so required, on the temperature of the gases ahead of the turbine, and by a judicious choice of the confluence cross sections at the exit from the blower, it is possible to control the operation of the powerplant so as to achieve the equality of the static pressure in the confluence sections of the "secondary" and "tertiary" flows, and in those of the hot and cold flow at the entrance to the combustion chamber 11a.

This transitional configuration corresponds to a mixed turbo-ramjet operation with partially mixed flows.

In the configuration shown in FIG. 7, the flaps 17a completely block the connecting passages 16a. The sliding body 33 is in its open position, as is the primary nozzle 6a.

At the exit from the turbine 10a, the hot primary flow is ejected through the primary nozzle 6a. The mixture of secondary and tertiary air feeds a supply of pure air directly to the combustion chamber 11a, which operates in the ramjet mode. The burnt gases are ejected through the secondary nozzle 12a.

It is important to maintain a high temperature ahead of the turbine. The rate of rotation of the primary-gas generator and the compatibility of the secondary and tertiary flows may be controlled by varying the cross-sectional area at the throat of the primary nozzle. Similarly, the throughput taken in by the ramjet can be controlled by varying the cross-sectional area at the throat of the secondary nozzle.

The operation of the primary generator has thus become completely independent of the ramjet, something which is desirable for the same reasons and with the same advantages as were set out above in relation to the single-flow gas turbine gas-type generator. This configuration corresponds, as in the case of a single-flow generator, to a mixed operation of turbo-ramjet with the flow entirely separate.

In the configuration shown in FIG. 8, the various structures occupy the same position as in the preceding configuration, but the primary combustion chamber 9a is extinguished. The powerplant operates as a pure ramjet. A portion of the throughput supplied by the air intake 5a may undergo expansion along the primary generator, which is therefore subject to the phenomenon of autorotation, with advantages comparable to those set out in the case of a single-flow primary generator.

FIGS. 9, 10 and 11 show on a larger scale and by way of nonlimitative example an adjustable arrangement for blocking the connecting passages 16 and apertures 19 as described in relation to FIGS. 1 to 4, in the case of a single-flow gas turbine generator.

A downstream portion 101 of the wall 1 bounding the primary duct is rigidly connected to the outer casing 102 of the turbine by means of a structure having the general shape of a truncated pyramid. The said structure may be reinforced by arms 103 passing through the corners of the truncated pyramid. The said arms can be hollow, and they also act to supply air to a cooling skin appertaining to the wall 101. The connecting passages 16, of a trapezoidal shape, are formed through the faces of the truncated pyramid. The wall 2 bounding the secondary duct possesses a downstream portion 104 connected to the wall 102 by a prismatic structure 105 through which are formed apertures 19 with a shape similar to that of the passages 16. As they pivot about the corner 18 common to both structures, the flaps 17 make it possible for either of the passages to be obturated.

It will be noted that the forces to be applied to the flaps 17 from a control device (not shown) are minor ones for in every case gas pressure is exerted in the required direction. In fact, while operating in the turbojet mode, the apertures 19 should be blocked off, a situation which coincides with the fact that the pressure of the primary flow is greater than that of the secondary flow. The result is an easy displacement of the flaps in the required direction, and the easy maintenance of these flaps in a position securing fluidtight obturation of the apertures 19. During operation in the ramjet mode conditions are reversed, and the flaps 17 tend to be applied against the apertures 16 under the effect of pressure from the secondary flow which, in this configuration, is greater than pressure from the primary flow.

FIGS. 12 and 13 relate to the case of a gas-turbine-type gas generator having dual flows and of the type described with respect to FIGS. 5 to 8. Here too there will be seen a structure shaped like a truncated pyramid connecting to each other the parts 101 and 102 of the wall 1 which bounds the primary duct 3. The wall 102 towards the downstream end has an extension 104 through which trapezoidal apertures 105 are formed.

The connecting passages 16a (see FIGS. 5 to 8) possess, as in the case of FIGS. 9 to 11, a trapezoidal shape corresponding to that of the apertures 105, and are likewise made through the faces of the truncated pyramid. The flaps 17a which cooperate with the passages 16a and the apertures 105 have the function of blocking off the passages 16a during the ramjet mode. When the powerplant is in the transitional configuration, the said flaps contribute towards facilitating the mixing of the hot and the cold flows and towards improving their distribution in the secondary combustion chamber.

FIGS. 14 and 15 show a somewhat simplified modification of the arrangement described in respect of FIGS. 12 and 13, the same reference numerals designating similar structure. This variant differs from the preceding arrangement because of the absence of the extension 104 and of the apertures 105.

Apart from the advantages already set forth, it will be noted that the arrangements according to the invention make possible the maximum mutual integration of the gas turbine jet and the ramjet engines. In particular, the air intake 5 and the secondary combustion chamber 11 are in common, as is the secondary nozzle 12. The result for the totality of the composite powerplant according to the invention is a reduced maximum cross section.

The arrangements according to the invention likewise render it possible to employ a single-flow or a dual-flow gas turbine jet engine with reheat while avoiding the interaction of the ramjet flow on the gas turbine jet flow when such interaction is harmful. During operation in the pure gas turbine jet mode, ejection always occurs through the secondary nozzle, the primary nozzle being blocked off. The latter is only used for the ejection of the primary flow during operation in the ramjet mode, when the two flows are isolated from each other.

The fact that the secondary combustion chamber 11 is positioned downstream of the communicating passages 17 makes it possible to apply reheat to the entirety of the throughput of the gas turbine jet engine, whether it be of the single-flow or of the dual-flow type. The result of this is a considerable increase in specific thrust during operation in the gas turbine jet mode, and an increase of thrust per unit of maximum cross section during operation in the ramjet mode, something that is particularly advantageous for high-velocity propulsion.

It will finally be noted that the housing wall 1 separating the two ducts is never subject at one and the same time on both surfaces to a very high temperature (the temperature of the gases escaping from the turbine being much less than that prevailing in the secondary combustion chamber), so that the putting into effect of this wall does not present particular technological difficulties.

It will be apparent that the embodiments described are only examples and that it would be possible to modify them in various ways within the scope of the invention as defined by the appended claims.

I claim:

1. A composite turbo-ramjet engine comprising, in combination:
   two ducts separated from each other by a wall and supplied with air from a common air intake, the two ducts consisting of, firstly, a primary duct which includes a gas turbine generator, a primary discharge nozzle, and adjustable means to block off the said primary nozzle; and secondly, a secondary duct including a secondary combustion chamber for ramjet operation and a secondary discharge nozzle;
   at least one connecting passage between the primary and the secondary ducts, the said passage being formed through said wall downstream of the turbine generator and upstream of the secondary combustion chamber;
   means of adjustable obturation for the said connecting passage;
   means of adjustable obturation for the secondary ramjet duct upstream of the secondary combustion chamber, said means of adjustable obturation for the connecting passage between the two ducts comprising at least one flap hinged on the wall separating the two ducts and movable between two extreme positions, the said flap blocking off the said connecting passage when the flap occupies one of its extreme positions.

2. A turbo-ramjet engine according to claim 1, wherein the secondary duct comprises an upstream section and a downstream section separated from each other by at least one obturable aperture arranged in the vicinity of the communicating passage between the two ducts, the said aperture being blocked off by the said flap when the latter occupies its other extreme position.

3. A turbo-ramjet engine comprising, in combination:
   an air intake;

a housing wall bounding a primary duct supplied with air from the said air intake, said primary duct including a compressor, a primary combustion chamber, an expansion gas turbine, a primary jet exhaust nozzle which opens directly into the atmosphere, and means to adjustably obturate said primary nozzle;

a casing wall spaced from said housing wall, said casing wall and said housing wall bounding together a secondary duct supplied with air from the same air intake, said secondary combustion chamber and a secondary jet exhaust nozzle which also opens directly into the atmosphere;

at least one passage extending through said housing wall and connecting said primary duct with said secondary duct, the said passage opening into said primary duct between said expansion gas turbine and said primary nozzle, and opening into said secondary duct upstream of said secondary combustion chamber;

adjustable obturating means for said connecting passage; and adjustable obturating means for the secondary duct upstream of said secondary combustion chamber.

4. A turbo-ramjet engine comprising, in combination:

an air intake;

a housing wall bounding a primary duct supplied with air from the said air intake, said primary duct including a compressor, a primary combustion chamber, an expansion gas turbine, a primary jet exhaust nozzle which opens directly into the atmosphere, and means to adjustably obturate said primary nozzle;

a casing wall spaced from said housing wall, said casing wall and said housing wall bounding together a secondary duct supplied with air from the same air intake, said secondary duct including a secondary combustion chamber and a secondary jet exhaust nozzle which also opens directly into the atmosphere;

at least one passage extending through said housing wall and connecting said primary duct with said secondary duct, the said passage opening into said primary duct between said expansion gas turbine and said primary nozzle, and opening into said secondary duct upstream of said secondary combustion chamber;

at least one flap hinged on said housing wall and adjustably movable between two extreme positions, the said flap completely blocking said passage when occupying one of said extreme positions; and adjustable obturating means for the secondary duct upstream of said secondary combustion chamber.

5. A turbo-ramjet engine according to claim 4, wherein the secondary duct comprises an upstream section and a downstream section separated from each other by at least one obturable aperture arranged in the vicinity of said connecting passage, the said aperture being blocked by said flap when the latter occupies its other extreme position.

6. A turbo-ramjet engine according to claim 3, comprising a supplementary passage extending through said housing wall and connecting said primary duct with said secondary duct, said supplementary passage opening into said primary duct upstream of said primary combustion chamber, whereby to define a structure permitting said engine to operate as a bypass gas turbine jet propulsion engine.

7. A turbo-ramjet engine according to claim 6, further comprising means to adjust the cross-sectional area of said supplementary passage.

* * * * *